Sept. 4, 1956   W. L. COOK ET AL   2,761,958
METHOD AND APPARATUS FOR FORMING HELICAL BLADE
Filed April 10, 1953
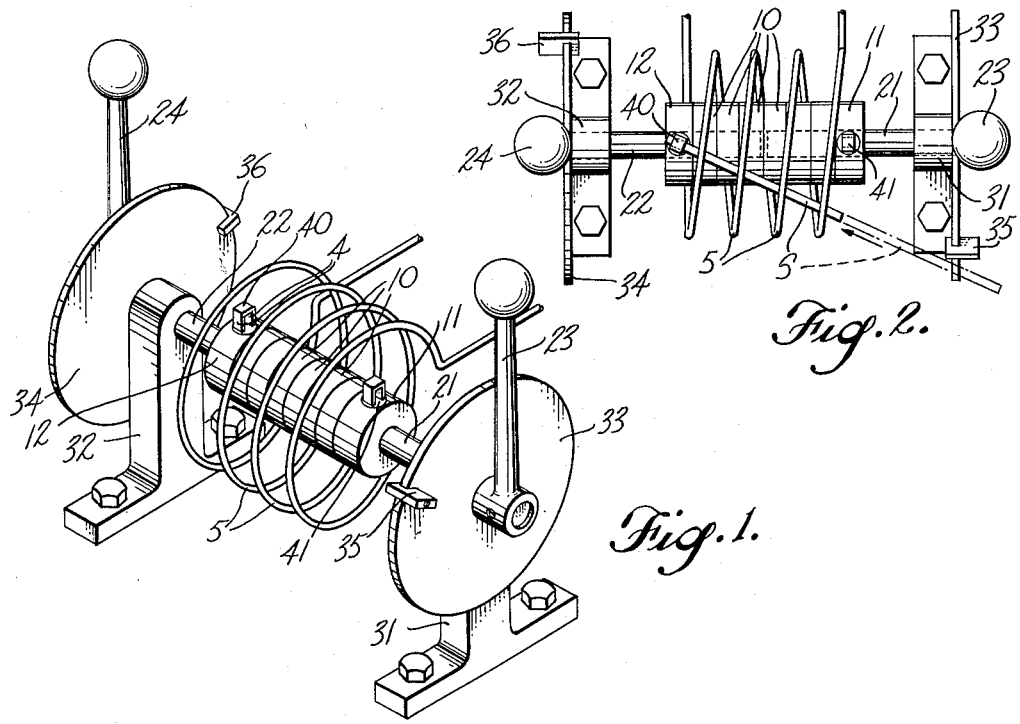
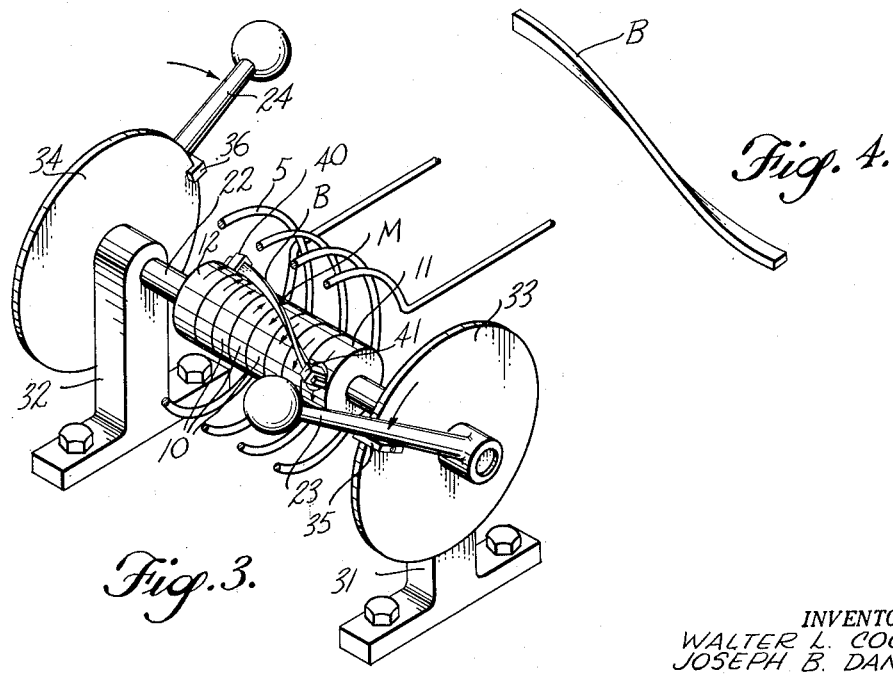
INVENTORS.
WALTER L. COOK
JOSEPH B. DANEL
BY
Reynolds, Beach & Christensen
ATTORNEYS

2,761,958

METHOD AND APPARATUS FOR FORMING HELICAL BLADE

Walter L. Cook and Joseph B. Danel, Seattle, Wash., assignors to Boeing Airplane Company, a corporation of Delaware Application April 10, 1953, Serial No. 348,048

8 Claims. (Cl. 219—153)

This invention deals with the forming of truly helical (as hereinafter defined) blades from flat strips of metal or the like, and concerns particularly the formation of a helical cutter blade or a blade insert (for convenience hereinafter termed simply "blades") of sintered silicon carbide, the inner and outer edges whereof define substantially true helices, and the faces whereof in each individual portion of its length are disposed substantially radially of the helix's axis, from a flat strip of such material the opposite edges whereof are substantially parallel. Such blades are used in milling cutters, and are especially desirable in machining wing spars, body stiffeners, and other components of airplanes, particularly of flexible-wing jet-propelled airplanes.

The advantage of such helical carbide blades over straight-fluted carbide blades and over helical cutters of high speed steel has been realized heretofore, but it has not been found possible heretofore to manufacture such blades accurately, uniformly, and at reasonable cost. Twisting can be accomplished fairly easily, but the strip must be both bent and twisted, for if it were not bent its ends would be high, and the resulting cut would be dished instead of flat. Unless all blades can be uniformly shaped to a high degree of accuracy, the several helical blades when brazed to a rod to form a milling cutter do not cut evenly.

It is known that fully sintered silicon carbide can be formed by heating it until the binder has softened enough to permit bending. The optimum temperature is 2200° F. At an appreciably lower temperature it will not bend properly; at a temperature higher by only 100° F. (2300°) the material is ruined. Heretofore such helical cutter blades of carbide were heated by an oxyacetylene torch to the desired temperature, then twisted manually with pliers to the desired shape, as nearly as possible. Incorrect bending or twisting, nonuniformity of temperature, and exceeding the 2300° temperature limit, caused a loss of about 25%, and uniformity of results was found impossible. By the present invention such losses have been practically eliminated, and blades made in accordance with this invention are so uniformly accurate that cutters employing such blades have hitherto unattainable accuracy of cut, even over wide cutting faces.

Such blades would ordinarily be true cylindrical helices, yet for the purpose of milling grooves or rounded ridges (concavities and convexities, respectively), the principles of this invention may still be employed, with suitable modification of the contour of the mandrel which will be described.

This invention concerns the method of forming such blades, and the machine wherewith they are formed. The drawings illustrate somewhat diagrammatically the machine and different steps in the process, and also the resultant product.

Figure 1 is an isometric view of the complete machine, with parts in their initial positions.

Figure 2 is a top plan view, primarily to illustrate the local rotatability of an end-securing yoke, and the manner of engaging a strip with the mandrel preparatory to forming a blade.

Figure 3 is an isometric view similar to Figure 1, illustrating the finish of the forming operation, and graphically the extent and sense of angular displacement in different parts of the strip's length.

Figure 4 is an isometric view of the finished blade.

The machine includes a cylindrical mandrel of correct size and shape, as will be explained later, the distinguishing characteristic of which is that it is composed of a plurality of independent disks, all of like diameter and coaxially disposed in substantial contiguity, but for independent rotation each with relation to all others. Moreover, only the terminal disks 11 and 12 are positively rotatable—indeed, one thereof might be fixed and only the other made rotatable, although it is preferred that both rotate—and all intervening disks 10 are wholly free from restraint, so that they may rotate if an angularly displacing force is applied to their periphery, and in an angular amount corresponding to the distance through which such a displacing force operates. A convenient mechanical form to such ends is to affix a shaft 21 to the terminal disk 11 and a shaft 22 to the terminal disk 12, or to form the respective shafts and disks integral, and to mount the intervening disks 10 upon the inwardly projecting ends of the shafts 21, 22 for free rotation thereabout. It will be understood that the disks 10 may be of any desired minimum thickness, as many as desired or required may be employed, and that the spacing apart of the terminal disks 11 and 12 will be governed by the length of the strip which is to be formed. The shafts are mounted in their coaxial relationship for independent rotation in bearing brackets 31, 32, to which, preferably, circular end plates 33, 34 respectively are affixed. Hand levers 23, 24 are secured to the outer ends of the respective shafts 21, 22, whereby they may be rotated. Stops 35, 36 on the disks 33, 34 or equivalent means engage the hand levers 23, 24, respectively, as stops to limit the extent of rotation, and such stops may be adjusted to whatever degree is desired. The normal angular deflection, in a milling cutter blade, is 15° to 20°.

Each terminal disk, 11 and 12 respectively, is provided with a yoke whereby to support the end portion of a strip S and to restrain such end portion from separation from the mandrel. Initially the strip S is supported in axial dispositon along the composite mandrel, with its faces substantially in an axial plane and with one edge— that which is to be the inner edge of the helical blade— in contact with each component disk. Accordingly, the yoke may take the form of a radially directed pair of fingers 4, spaced apart by the thickness of the strip S, and a bridge piece 40 joining the outer ends of the fingers 4, at a distance from the mandrel's peripheral surface corresponding to the width of the strip S. This bridge piece overlies and serves to restrain the strip, when the strip is snugly received within the yoke, so that the strip's ends in particular can not incline outwardly away from the mandrel, and so that the entire inner edge of the strip is held in contact with the several disks 11, 12, 10 during the forming operation. Such a yoke will permit endwise movement of the strip through the yoke.

Since no surface of a helical blade such as this is parallel to the axis, as are both faces of the strip when its two end portions are initially received in the respective yokes, it is necessary to provide for rotation of the yokes about local radial axes, unless the kink in the end portions of the blades resulting from relative angular displacement of their end portions is to be removed, which is scarcely practicable. This local rotation of each yoke is readily accomplished by forming it with a cylindrical base portion 41, rotatively received within a radial aperture in its disk 11 or 12. The local rotatability of the yoke at the left is demonstrated graphically in Figure 2, by comparison with the non-rotated yoke at the right. This figure illustrates primarily the manner of engaging a strip with the mandrel, preparatory to forming it into a blade.

The strip must be heated throughout to a rather precise temperature, 2200° F., and that temperature must be maintained during the forming operation. A temperature as high as 2300° F. will ruin the blade, whereas a temperature materially lower than 2200° F. will not enable proper forming. One of the causes of failure heretofore has been the difficulty of raising the temperature of the strip to and of maintaining its temperature uniformly at the optimum value, without exceeding the critical temperature, when the heating was accomplished by an oxyacetylene torch. Even with the mandrel and its yoke as described above, it would be difficult to accomplish satisfactory forming with acceptable regularity and accuracy, were the heating to be accomplished by the old means. It has been found that the advantages of the mandrel, to be explained more fully hereinafter, are only realized to the full when the strip is heated uniformly, dependably, and to a precise and controllable temperature by an induction coil. Such a coil 5 is shown surrounding the mandrel and the strip S mounted thereon. This coil is of appropriate characteristics, and appropriately regulated by known means, not shown, to produce quickly and to maintain without exceeding the desired temperature, say 2200° F.

In performing the method a strip S is engaged at its opposite end portions (see Figure 2) by the yokes 4, 40, and is thereby positioned along the mandrel, parallel to its axis, in edge contact with each disk of the mandrel, and with its opposite faces substantially in axial planes; preferably it is of a length such that it extends somewhat at each end beyond the respective yokes. The strip is thus supported at its end portions, only, in a fixed position and relationship to the mandrel and to its component disks, and its end portions, only, are restrained against separation from the mandrel. The end portions can pull endwise through the yoke, and if the yokes are, as preferred, locally pivotally mounted in the respective terminal disks, each end portion may also deflect angularly relative to the axis of the mandrel, which is also the axis of the helical blade B which is the final product. All intermediate portions of the strip are free of restraint, and it is particularly to be noted that they are not positively engaged by any intermediate disk 10; the only engagement between the strip and the intermediate disks is the edge contact between the inner edge of the strip and the peripheral edge of each disk 10.

Now the strip is heated to a forming temperature, say 2200° F., by the induction coil preferably, or in the case a less critical material is being formed, by any equivalent means. When properly heated the opposite ends of the strip are relatively angularly displaced, by manipulation of the hand levers 23, 24; preferably each is displaced angularly but oppositely in sense relative to the other, until each engages its stop 35 or 36, as in Figure 3. The result is that each end portion, engaged by its yoke, is displaced angularly a maximum distance relative to some mid-portion M that is not displaced at all, and each portion of the strip successively outwardly from the mid-portion M is displaced angularly by a progressively increasing amount, as is represented by the several arrows in Figure 3, but never by an amount as great as the maximum displacement of the yoke-engaged end portions. Since the strip is not only twisted but is also bent, inasmuch as its end portions are restrained from departure from the mandrel, all intervening portions are pressed inwardly against and bent around the contiguous disks 10. Each such disk, being free to rotate, is caused to rotate by this inward pressure of the strip upon it. Each disk 10 being rotatable independently of all other disks, each will be so rotated only in the amount and angular sense appropriate to the formation of a true helix, and the formation of the helix is not impeded by appreciable resistance to relative movement between a solid mandrel, if one were to be used, and the strip, nor between the several disks and any contiguous disk, as actually employed.

The end portions of the strip slip through their yokes as the distance between yokes increases by reason of their angular displacement, yet this has no effect upon the restraining and conforming functions of the yokes and the mandrel or its components. Likewise, by the local rotation of each yoke about its local radial axis, kinking is prevented and each helix B is true from yoke to yoke.

It is evident that the employment of a composite mandrel formed of many such disks is essential to the method itself, and that without such a multiple-disk mandrel the method could not be performed successfully. Neither, in the forming of carbide blades, could the method be satisfactorily performed except an induction coil be used to heat the strip.

The blade B is permitted to cool, after being formed to a temperature at which it will maintain its helical shape, and will not be deformed, and is then removed from the mandrel. The operation is thus complete. The blade's inner edge is a true helix of a diameter corresponding to that of the mandrel, and its outer edge is also a true helix of a diameter as much greater as is represented by the width of the blade. Its faces, in every portion of its length, lie substantially in radii through the axis of the helices.

Several such blades, all substantially identical, are brazed or otherwise secured upon a cylindrical rod or the like to form a milling cutter.

It is to be noted that the angular displacement of the individual intermediate disks 10 is caused by reason of such force as is imparted to such disks, at their peripheries, by the strip in process of being formed. The force originates with the strip, and is imparted to the disks, which are free to rotate as much or as little as they need to. It has been attempted heretofore to effect the forming of such a strip by engaging it positively with each successive disk of a similar mandrel, and by differentially and positively rotating each such disk. Thereby the force originates with the several disks, and is imparted to the strip, which is the reverse of the present process and machine. This prior process and machine are not a part of this invention.

It has been mentioned that helical blades to mill out a groove, or to finish a rounded ridge, can be formed according to this invention. It is only necessary to vary the contour of the mandrel, relatively varying the diameters of its component disks in accordance with the shape desired; the bending of the blade in forming will conform to such contours if the latter are not too abrupt. Accordingly, the description of the blades as "helical" is intended to include such variations in contour as well as a true cylindrical helix.

The process and the machine have been especially designed for the formation of helical blades from the hard, difficultly formable material such as the sintered silicon carbide first mentioned, and are the only means known to us whereby this can be done with uniform accuracy and success. Nevertheless, they can be utilized for the formation of lawn mower blades or other similar helical articles, of less obdurate materials, and such changes in detail may be made as will best adapt the principles of this invention to such different purposes or materials. For example, while it is virtually essential that controlled induction heating be employed, with such a mandrel, in forming carbide cutter blades, a torch might be a quite satisfactory heat source in forming a lawn mower blade or some other helical, bladelike article, and yet the mandrel would be highly useful in such case with the different heat source. It is not intended that the general application of the principles of the invention be restricted, notwithstanding certain restrictions upon spe-

We claim as our invention:

1. A method of forming a helical milling cutter blade or the like from a flat strip of hard material such as silicon carbide, in such form that every portion of the blade's length extends substantially radially of the helix's axis, which method comprises: initially disposing the strip parallel to the axis of and with one edge contacting the peripheral surface of a composite mandrel made up of a plurality of uninterruptedly circular but independently rotatable disks all of like diameter, which diameter is equivalent to the diameter of the inside edge of the desired helical blade; securing the end portions only of the strip to the respective terminal disks of the mandrel, in radial disposition and against separation from the mandrel but leaving them free to move lengthwise, leaving the strip's entire intervening portion free of any restraint and except as its inner edge is in contact with the peripheries of the intervening disks; malleablizing the strip, and rotating its secured end portions in opposite angular senses and to the desired angular extent, solely by such opposite rotation of its end portions effecting similar but progressively less angular displacement of successive portions of the strip and progressively less rotation of the several circular disks of the mandrel which are respectively engaged thereby, successively inwardly from each end portion to about the mid-portion of the strip, and of the mandrel's length.

2. A method of forming a helical milling cutter blade from a flat strip of sintered silicon carbide the opposite edges whereof are parallel, in such form that in every portion of its length the faces of the helical blade extend substantially radially of the helix's axis, and the originally parallel opposite edges are substantially true helices of uniform pitch, which method comprises: initially disposing the strip in parallelism with the axis of and along the peripheral surface of a composite mandrel made up of a plurality of independently rotatable uninterruptedly circular disks of uniform diameter, which diameter is equivalent to the diameter of the inside edge of the desired helical blade; supporting the strip by its ends only from the two terminal disks, respectively, in an axial radial plane, with its inner edge resting upon the peripheries of the several disks, and restraining the strip at the terminal disks only against separation from the mandrel, leaving the intervening portion of the strip free of any restraint except as its inner edge contacts the peripheries of the intervening disks; malleabilizing the strip, while thus supported and restrained; and rotating the terminal disks in opposite angular senses and by substantially equal amounts from the initial position, while the strip is at forming temperature; the securement and restraint of the strip's ends being of such nature as will permit rotation about a radius through each point of securement and restraint, and movement of the strip lengthwise relative to such points of securement and restraint as the distance therebetween increases with opposite rotation of the terminal disks.

3. Mechanism for forming, from flat strip stock, a helical blade in such form that in every portion of its length its faces extend substantially radially of the helix's axis, and its inner and outer edges define substantially true helices of uniform pitch, which mechanism comprises: a composite mandrel formed of a plurality of uniformly and uninterruptedly circular disks of uniform diameter, which diameter is equivalent to the diameter of the inside edge of the desired helical blade; means supporting the several disks in coaxial, substantially contiguous disposition for independent rotation, each relative to the others; means mounted upon each terminal disk, only, for supporting a strip by its respective end portions only, directed lengthwise along the mandrel, and with one edge contacting the several intervening disks, and its faces lying in substantially axial planes; means to restrain the thus-supported end portions, only, against separation from the respective terminal disks; and means to effect relative rotation between the two terminal disks while the strip is malleablized to offset one end portion from the other through the desired angular amount, the intervening disks rotating each independently through a coordinate but lesser angular amount solely under the influence of the angular displacement of the intervening portion of the strip which contacts each given intervening disk.

4. Mechanism as and for the purpose stated in claim 3 wherein the strip-end supporting and restraining means is formed as a yoke projecting radially from each terminal disk and formed to snugly receive the respective strip end portions, and overlying the outer edge thereof to maintain the inner edge thereof in contact with the corresponding terminal disk.

5. Mechanism as and for the purpose stated in claim 4 wherein each yoke is pivotally mounted in its terminal disk for rotation, as the forming of the strip progresses, about a radial axis.

6. Mechanism for the purpose specified, comprising two independent shafts, means supporting said shafts in coaxial disposition, with their ends adjacent, for independent rotative movement, a terminal disk secured on each shaft, distant from such point of adjacency, a plurality of disks each freely and independently rotatively mounted upon said shafts, intermediate said terminal disks, all the disks being uninterruptedly circular and of like diameter, a yoke projecting radially from each terminal disk and rotatively mounted therein for angular movement about a radial axis, each yoke being formed with a transverse slot, elongated in the radial direction and closed at its outer end, of a size and shape to snugly receive the respective end portions of a strip which is to be helically bent, and means operatively connected to each shaft to effect angular displacement thereof relative to and oppositely from the displacement of the other shaft, from a position wherein the respective yokes are axially aligned to a position wherein they are angularly displaced.

7. A method of forming from flat strip stock a helical blade which, in all parts of its length, extends radially of the helix's axis, which method comprises initially mounting the strip in the direction axially of an uninterruptedly cylindrical mandrel of equal radius throughout, with the inner edge of the strip disposed in contact with an elemental line of the mandrel's periphery, and with the strip's end portions only secured in radial disposition, restrained against separation from the mandrel but free to move lengthwise relative to the mandrel, and its intervening portions free of restraint except as the inner edge thereof continues to contact the mandrel's periphery; malleabilizing the strip; and effecting relative angular displacement of the strip's end portions to the desired angular extent, and to effect helical twisting of the unrestrained intervening portions solely by the torque applied to the restrained end portions.

8. A method of forming from flat strip stock a helical blade which, in all parts of its length, extends radially of the axis of such a helix, which method comprises initially mounting the strip in the direction axially of a mandrel the surface whereof is uninterrupted and the cross-section whereof is circular in all parts of its length, with the inner edge of the strip disposed in contact with an elemental line of the mandrel's periphery, and with the strip's end portions, only, secured in radial disposition, restrained against separation from the mandrel but free to move lengthwise relative to the mandrel, and its intervening portions free of restraint except as the inner edge thereof continues to contact the mandrel's periphery; malleabilizing the strip; and effecting relative angular displacement of the strip's end portions to the desired angular extent, and to effect helical twisting of the unrestrained intervening portions solely by the torque applied to the restrained end portions.

References Cited in the file of this patent

UNITED STATES PATENTS

| | | |
|---|---|---|
| 194,409 | Braun | Aug. 21, 1877 |
| 2,046,619 | Funk | July 7, 1936 |
| 2,461,323 | Hille | Feb. 8, 1949 |
| 2,566,412 | Hannes | Sept. 4, 1951 |